(12) United States Patent
Sun et al.

(10) Patent No.: US 9,742,263 B2
(45) Date of Patent: Aug. 22, 2017

(54) METHOD AND APPARATUS FOR AUTOMATICALLY EQUALIZING BUS BAR VOLTAGES OF POWER FACTOR CORRECTION PFC CIRCUIT

(71) Applicant: Emerson Network Power, Energy Systems, North America, Inc., Warrenville, IL (US)

(72) Inventors: Jing Sun, Xi'an (CN); Huajun Lv, Xi'an (CN); Jing Sun, Xi'an (CN)

(73) Assignee: VERTIV ENERGY SYSTEMS, INC., Lombard, IL (US)

( * ) Notice: Subject to any disclaimer, the term of this patent is extended or adjusted under 35 U.S.C. 154(b) by 890 days.

(21) Appl. No.: 13/953,028

(22) Filed: Jul. 29, 2013

(65) Prior Publication Data
US 2015/0029770 A1 Jan. 29, 2015

(51) Int. Cl.
*H02K 7/14* (2006.01)
*H02M 1/42* (2007.01)
*H02J 1/06* (2006.01)
*H02M 1/00* (2006.01)

(52) U.S. Cl.
CPC ............ *H02M 1/4208* (2013.01); *H02J 1/06* (2013.01); *H02M 2001/0032* (2013.01); *Y02B 70/126* (2013.01); *Y02B 70/16* (2013.01); *Y02P 80/112* (2015.11)

(58) Field of Classification Search
USPC ............... 318/3, 572, 9, 599, 650, 400.3
See application file for complete search history.

(56) References Cited

U.S. PATENT DOCUMENTS

| | | | |
|---|---|---|---|
| 6,469,487 B2 * | 10/2002 | Ewert | F25B 27/005 323/906 |
| 8,901,906 B2 * | 12/2014 | Yonezawa | H02M 1/08 323/282 |
| 2002/0109478 A1 * | 8/2002 | Horng | H02P 7/2913 318/807 |

* cited by examiner

*Primary Examiner* — Eduardo Colon Santana
*Assistant Examiner* — Iftekhar Mustafa
(74) *Attorney, Agent, or Firm* — Harness, Dickey & Pierce, P.L.C.

(57) ABSTRACT

An automatic equalization method and apparatus for bus bar voltages of a Power Factor Correction (PFC) circuit. The method includes calculating a difference in voltages of a positive bus bar and a negative bus bar, and increasing the rotation speed of a fan in the PFC circuit according to the difference in voltages of the positive bus bar and the negative bus bar until the voltages of the positive and negative bus bars are equalized. The apparatus includes a voltage difference module configured to calculate a difference in voltages of a positive bus bar and a negative bus bar, and a rotation speed control module configured to increase a rotation speed of a fan in the PFC circuit according to the difference in voltages of the positive bus bar and the negative bus bar, until the voltages of the positive and negative bus bars are equalized.

16 Claims, 6 Drawing Sheets

METHOD AND APPARATUS FOR AUTOMATICALLY EQUALIZING BUS BAR VOLTAGES OF POWER FACTOR CORRECTION PFC CIRCUIT

FIELD OF THE INVENTION

The present invention relates to the field of circuits and in particular to a method and apparatus for automatically equalizing bus bar voltages of a Power Factor Correction (PFC) circuit.

BACKGROUND OF THE INVENTION

A PFC circuit is typically adopted in a high-power supply source to improve a power factor of the supply source. For a PFC circuit with a structure of positive and negative bus bars, whether voltages of the positive and negative bus bars are balanced will influence a voltage stress on a switch tube in the structure of the PFC circuit, over-voltage protection strategy and other issues, and it is thus necessary to take measures to equalize the voltages of the positive and negative bus bars so that the voltages of the positive and negative bus bars are in an equalized condition.

A biased voltage loop is adopted in the PFC circuit to control the voltages of the positive and negative bus bars to be in an equalized condition, and the biased voltage loop adjusts charging energy of the positive and negative bus bars primarily by affecting the transmitted waves of Pulse Width Modulation (PWM) and further renders the voltages of the positive and negative bus bars in an equalized condition. Typically when the hardware design is reasonable and the loop design is appropriate in the PFC circuit, the biased voltage loop has a good effect of equalizing the voltages of the bus bars; but when the PFC circuit operates in an approximately uncontrolled rectification condition or is lightly loaded, the ability of the biased voltage loop to adjust and equalize the voltages of the bus bars will be weaken and fails to well control the equalization condition of the positive and negative bus bars, thus resulting in a serious bias voltage phenomenon. This is primarily because when the PFC circuit operates in an approximately uncontrolled rectification or lightly loaded condition, there is a small amount of transmitted waves of PFC circuit and even an intermittent wave transmission condition (waves are transmitted for a period of time and then ceased for a period of time), so that the biased voltage loop will be operative for a limited period of time and the ability to adjust and equalize the voltages of the bus bars will not be effectively enforced, thus unbalancing the voltages of the bus bars.

SUMMARY OF THE INVENTION

The invention provides a method and apparatus for automatically equalizing bus bar voltages of a Power Factor Correction (PFC) circuit so as to address the problem of unbalanced voltages of positive and negative bus bars when the PFC circuit operates in an uncontrolled rectification condition or is lightly loaded.

The invention proposes the following solutions:

A method for automatically equalizing bus bar voltages of a Power Factor Correction (PFC) circuit, including:

calculating a difference in voltages of a positive bus bar and a negative bus bar; and
increasing a rotation speed of a fan in the PFC circuit by the difference in voltages of the positive bus bar and the negative bus bar until the voltages of the positive and negative bus bars are equalized.

An apparatus for automatically equalizing bus bar voltages of a Power Factor Correction (PFC) circuit, including:

a voltage difference module configured to calculate the difference in voltages of a positive bus bar and a negative bus bar; and
a rotation speed control module configured to increase the rotation speed of a fan in the PFC circuit by the difference in voltages of the positive bus bar and the negative bus bar until the voltages of the positive and negative bus bars are equalized.

In the invention, based upon such a principle that when a PFC circuit operates in an uncontrolled recitification condition or is lightly loaded, the PFC circuit has increased output power and consequently an increased amount of transmitted waves of PWM, and the ability of a biased voltage loop to adjust the voltage equalization of positive and negative bus bars is also improved, by increasing the rotation speed of a fan, the output power of the PFC circuit can be increased and further the ability of the biased voltage loop to adjust the voltage equalization of the bus bars can be improved, achieving the purpose of adjusting the voltage equalization of the positive and negative bus bars. The invention can effectively address the problem of unbalanced voltages of the positive and negative bus bars when the PFC circuit operates in an uncontrolled rectification condition or is lightly loaded, without adding any other circuit in hardware for the PFC circuit and without changing an original circuit structure of the PFC circuit.

DETAILED DESCRIPTION OF THE INVENTION

A method and apparatus for automatically equalizing bus bar voltages of a Power Factor Correction (PFC) circuit according to the invention will be further detailed below with reference to the drawings and particular embodiments thereof.

It shall be noted that:

1. A PFC circuit as referred to in the invention refers to a currently widely used digital PFC circuit, and a PFC circuit as mentioned in this application refers to a digital PFC circuit unless otherwise indicated;

2. The difference in voltages of a positive bus bar and a negative bus bar as referred to in the invention refers to the absolute value of the difference in voltages of the positive bus bar and the negative bus bar, and the difference between a preset voltage value and the difference between a voltage of the positive bus bar and a voltage of the negative bus bar refers to the absolute value of the difference between the preset voltage value and the absolute value of the difference between the voltage of the positive bus bar and the voltage of the negative bus bar, and.

When a PFC circuit operates in an uncontrolled rectification condition or in a lightly loaded condition, if the PFC circuit has an increased load and increased output power, then the amount of transmitted waves of PWM of the PFC circuit will be increased, so that the ability of a biased voltage loop to adjust the voltage equalization will be effectively enforced, thereby achieving the purpose of adjusting the voltages of positive and negative bus bars toward equalization. In summary, when a PFC circuit operates in an uncontrolled rectification condition or in a lightly loaded condition, the purpose of equalizing bus bar voltages can be achieved by increasing a load of the PFC circuit. A fan is one of devices constituting the PFC circuit, and the fan can be directly connected across the positive and negative bus bars as a direct load or indirectly connected across the positive and negative bus bars as an indirect load, and output power of the PFC circuit will also be increased with an increasing rotation speed of the fan, which is equivalent to an increase in the load of the PFC circuit, so the purpose of equalizing the bus bar voltages can be achieved by controlling the fan to increase the rotation speed.

Figure 1:
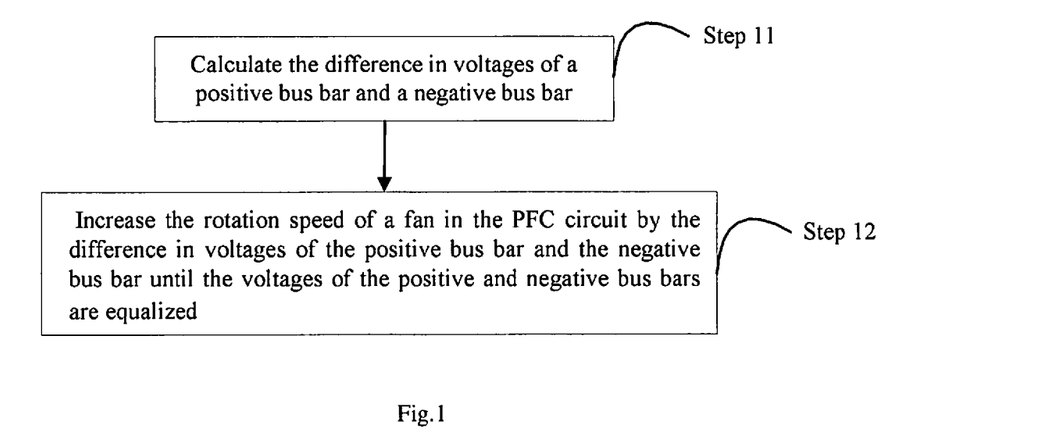
FIG. 1 is a flow chart of a method for automatically equalizing bus bar voltages of a PFC circuit according to an embodiment of the invention.

Following the foregoing principle, the invention provides an automatic equalization method for bus bar voltages of a PFC circuit, and as illustrated in FIG. 1, the method includes:

Step 11, in which the difference in voltages of a positive bus bar and a negative bus bar is calculated; and Step 12, in which the rotation speed of a fan in the PFC circuit is increased by the difference in voltage between the positive bus bar and the negative bus bar until the voltages of the positive and negative bus bars are equalized.

In the invention, based upon such a principle that when a PFC circuit operates in an uncontrolled rectification condition or a lightly loaded condition, the PFC circuit has increased output power and consequently an increased amount of transmitted waves of PWM, and accordingly the ability of a biased voltage loop to adjust the voltage equalization of positive and negative bus bars is also improved, by increasing the rotation speed of a fan, the output power of the PFC circuit can be increased and therefore achieving the purpose of enhancing the adjustment for the voltage equalization of the positive and negative bus bars by the biased voltage loop. According to the invention, the problem of unbalanced voltages of the positive and negative bus bars when the PFC circuit operates in an uncontrolled rectification condition or is lightly loaded can be effectively addressed, without adding any other circuit in hardware for the PFC circuit and without changing an original circuit structure of the PFC circuit.

Preferably in step 11, the difference in voltages of the positive bus bar and the negative bus bar is calculated particularly as follows:

The voltage of the positive bus bar and the voltage of the negative bus bar are determined respectively; and The difference between a preset voltage value and the difference between the voltage of the positive bus bar and the voltage of the negative bus bar is determined as the difference in voltages of the positive bus bar and the negative bus bar.

Ideally, voltage equalization of the positive and negative bus bars in the PFC circuit refers to the voltage of the positive bus bar being equal to the voltage of the negative bus bar, that is, the difference in voltages of the positive bus bar and the negative bus bar (simply referred to as the difference in voltages of the positive and negative bus bars below) being zero, but in a real PFC circuit, characteristics of respective electronic devices can not be ideal, so the voltages of the positive and negative bus bars can be determined to be balanced/equalized when the difference between the voltage of the positive bus bar and the voltage of the negative bus bar fluctuates within an allowable range.

Specifically a preset voltage value can be determined depending on the actual condition of the PFC circuit, and the difference between the preset voltage value and the difference between the voltage of the positive bus bar and the voltage of the negative bus bar is determined as the difference in voltages of the positive bus bar and the negative bus bar.

In a particular implementation, if the obtained voltage of the positive bus bar and voltage of the negative bus are real quantities of the voltages and the preset voltage value is an analogy voltage quantity, that is, they are at different levels of quantities, when calculating difference in voltages of the positive bus bar and the negative bus bar, the above both shall be converted into the same level of quantity and then calculation is performed.

Preferably, in step 12, the rotation speed of the fan in the PFC circuit can be increased according to the difference in voltages of the positive bus bar and the negative bus bar as follows:

An overlap duty ratio signal is derived from the difference in voltages of the positive bus bar and the negative bus bar;

An original duty ratio signal of the fan is determined;

A duty ratio signal is derived from the overlap duty ratio signal and the original duty ratio signal; and Pulse Width Modulation (PWM) is performed on the duty ratio signal to generate a drive signal to drive the fan to increase the rotation speed.

Specifically, in order to achieve the purpose of controlling the fan to increase the rotation speed according to the difference in voltages of the positive and negative bus bars, according to the invention, the overlap duty ratio signal required for increasing the rotation speed of the fan can be calculated from the difference in voltages of the positive and negative bus bars, and the duty ratio signal required for rotation after controlling the fan to increase the rotation speed can be derived from the overlap duty ratio signal and the original duty ratio signal of the fan, then a drive signal to drive the fan to increase rotation speed to rotate is generated by performing Pulse Width Modulation (PWM) on the duty ratio signal, and finally the fan rotates at the increased rotation speed driven by the drive signal, where the original duty ratio signal of the fan is a duty ratio calculated under a normal control strategy of the fan.

In the method of the invention, when the rotation speed of the fan in the PFC circuit is increased according to the difference in voltages of the positive and negative bus bars as described above, since the rotation speed of the fan is finally increased by providing the drive signal (the pulse-width-modulated pulse signal) for increasing the rotation speed of the fan, the fan will rotate under the normal control strategy when the drive signal for increasing the rotation speed of the fan is not provided any longer, thus ensuring that when the rotation speed of the fan is increased, the output power of the PFC circuit is increased, and the ability of the biased voltage loop to adjust the voltage equalization of the positive and negative bus bars is improved to thereby adjust the voltages of the positive and negative bus bars toward equalization; when the difference in voltages of the positive and negative bus bars is decreased, the drive signal provided by the difference in voltage between the positive and negative bus bars to increase the rotation speed of the fan will be weaken to thereby lower the rotation speed of the fan; and finally both the difference in voltages of the positive and negative bus bars and the rotation speed of the fan will be in a stabilized condition.

The invention will not be particularly limited regarding how to derive the overlap duty ratio signal from the difference in voltages of the positive and negative bus bars as long as the overlap duty ratio signal required to increase the rotation speed of the fan can be calculated from the difference in voltages of the positive and negative bus bars.

Preferably, the overlap duty ratio signal can be derived from the difference in voltages of the positive and negative bus bars particularly as follows:

Proportion-integration-differentiation control is performed on the difference in voltages of the positive bus bar and the negative bus bar to obtain a comparison amount of overlap transmitted waves; and The ratio of the comparison amount of overlap transmitted waves to a period amount of transmitted waves is calculated to obtain the overlap duty ratio signal.

Specifically, the PFC circuit controls a PWM wave transmission process typically with a microcontroller (e.g., a Digital Signal Processor (DSP)), particularly, controlling PWM wave transmission through configuring a wave transmission comparison register and period register in the microcontroller. Specifically the ratio of the comparison amount of transmitted waves stored in the comparison register to the period amount of transmitted waves stored in the period register is calculated to obtain the duty ratio signal, where the period amount of transmitted waves stored in the period register is typically a constant value, and the duty ratio can be changed simply by changing the comparison amount of transmitted waves; in the invention, the original duty ratio signal of the fan can be derived by using the ratio of a comparison amount of transmitted waves to the period amount of transmitted waves used for the fan in normal rotation; and the comparison amount of overlap transmitted waves required to increase the rotation speed of the fan can be obtained according to the invention by performing Proportion-Integration-Differentiation (PID) control on the difference in voltage between the positive and negative bus bars, and the ratio of the comparison amount of overlap transmitted waves to the period amount of transmitted waves is the overlap duty ratio signal required to increase the rotation speed of the fan, that is, the comparison amount of overlap transmitted waves corresponds to the overlap duty ratio signal in a one-to-one manner.

Specifically, parameters used for performing Proportion-Integration-Differentiation (PID) control can be determined from a function relationship between the difference in voltages of the positive and negative bus bars and the amount of change in rotation speed of the fan, where the function relationship between the difference in voltages of the positive and negative bus bars and the amount of change in rotation speed of the fan can be determined as follows: the function relationship between the difference in voltages of the positive and negative bus bars and the amount of change in rotation speed of the fan is determined through mathematic modeling; or the function relationship between the difference in voltages of the positive and negative bus bars and the amount of change in rotation speed of the fan is determined by performing real measurements and recording for a plurality of times the differences in voltages of the positive and negative bus bars and the resultant amounts of the change in rotation speed of the fan.

Preferably, the rotation speed of the fan is in direct proportion to the duty ratio signal, and then the duty ratio signal can be derived from the overlap duty ratio signal and the original duty ratio signal, specifically by a process including: summing the original duty ratio signal and the overlap duty ratio signal to obtain the duty ratio signal;

The rotation speed of the fan is in inverse proportion to the duty ratio signal, and then the duty ratio signal can be derived from the overlap duty ratio signal and the original duty ratio signal, specifically by a process including: subtracting the overlap duty ratio signal and the original duty ratio signal to obtain the duty ratio signal.

Specifically, when the rotation speed of the fan is in direct proportion to the duty ratio signal for driving the fan to rotate, that is, when the rotation speed of the fan also increases with an increasing duty ratio signal, for the purpose of adjusting the voltage equalization of the positive and negative bus bars by increasing the rotation speed of the fan, the original duty ratio signal and the overlap duty ratio signal will be summed up to obtain the duty ratio signal; and on the contrary, when the rotation speed of the fan is in inverse proportion to the duty ratio signal for driving the fan to rotate, the overlap duty ratio signal and the original duty ratio signal will be subtracted to obtain the duty ratio signal.

Preferably, in step 12, the rotation speed of the fan in the PFC circuit can be increased by the difference in voltages of the positive bus bar and the negative bus bar as follows:

A comparison amount of overlap transmitted waves is determined from the difference in voltages of the positive bus bar and the negative bus bar;

A comparison amount of original transmitted waves of the fan is determined;

A comparison amount of transmitted waves is derived from the comparison amount of original transmitted waves and the comparison amount of overlap transmitted waves;

The ratio of the comparison amount of transmitted waves to a period amount of transmitted waves is calculated to obtain the duty ratio signal; and Pulse Width Modulation (PWM) is performed on the duty ratio signal to generate a drive signal to drive the fan to increase the rotation speed.

Specifically, the PFC circuit controls a PWM wave transmission process typically with a microcontroller (e.g., a DSP), specifically, controlling PWM wave transmission through configuring a wave transmission comparison register and period register in the microcontroller. Specifically, the ratio of the comparison amount of transmitted waves stored in the comparison register to the period amount of transmitted waves stored in the period register is calculated to obtain the duty ratio signal, where the period amount of transmitted waves stored in the period register is typically a constant value, and a duty ratio can be changed simply by changing the comparison amount of transmitted waves; and thus in order to achieve the purpose of controlling the fan to increase rotation speed according to the difference in voltages of the positive and negative bus bars, according to the invention, the comparison amount of overlap transmitted waves required to increase the rotation speed of the fan can be determined from the difference in voltages of the positive bus bar and the negative bus bar, the comparison amount of transmitted waves required for rotation after controlling the fan increase rotation speed can be derived from the comparison amount of overlap transmitted waves and the comparison amount of original transmitted waves of the fan, then the ratio of the comparison amount of transmitted waves to the period amount of transmitted waves stored in the period register is calculated to obtain the duty ratio signal required for rotation after controlling the fan to increase rotation speed, and finally pulse width modulation is performed on the duty ratio signal to generate the drive signal to drive the fan to rotate at the increased rotation speed, and finally the fan rotates at the increased rotation speed driven by the drive signal.

Preferably, the comparison amount of overlap transmitted waves can be determined from the difference in voltages of the positive and negative bus bars specifically as follows, including:

Performing proportion-Integration-Differentiation (PID) control on the difference in voltages of the positive and negative bus bars to obtain the comparison amount of overlap transmitted waves.

The invention will not be particularly limited regarding how to derive the comparison amount of overlap transmitted waves from the difference in voltages of the positive and negative bus bars, for example, a Proportion-Integration-Differentiation (PID) control approach or other variant control approaches, e.g., Proportion (P) control, Proportion-Integration (PI) control or other variants of Proportion-Integration-Differentiation (PID) control can be used.

Preferably, the rotation speed of the fan is in direct proportion to the duty ratio signal, and then the comparison amount of transmitted waves can be derived from the comparison amount of original transmitted waves and the comparison amount of overlap transmitted waves, specifically including: summing the comparison amount of original transmitted waves and the comparison amount of overlap transmitted waves to obtain the comparison amount of transmitted waves;

The rotation speed of the fan is in inverse proportion to the duty ratio signal, and then the comparison amount of transmitted waves can be derived from the comparison amount of original transmitted waves and the comparison amount of overlap transmitted waves, specifically including: subtracting the comparison amount of overlap transmitted waves and the comparison amount of original transmitted waves to obtain the comparison amount of transmitted waves.

Specifically, when the rotation speed of the fan is in direct proportion to the comparison amount of transmitted waves for driving the fan to rotate, that is, when the rotation speed of the fan also increases with an increasing comparison amount of transmitted waves, the comparison amount of original transmitted waves and the comparison amount of overlap transmitted waves will be summed up to obtain the comparison amount of transmitted waves for the purpose of adjusting the voltage equalization of the positive and negative bus bars by increasing the rotation speed of the fan; and on the contrary, when the rotation speed of the fan is in inverse proportion to the comparison amount of transmitted waves for driving the fan to rotate, the comparison amount of overlap transmitted waves and the comparison amount of original transmitted waves will be subtracted to obtain the comparison amount of transmitted waves.

Figure 2:
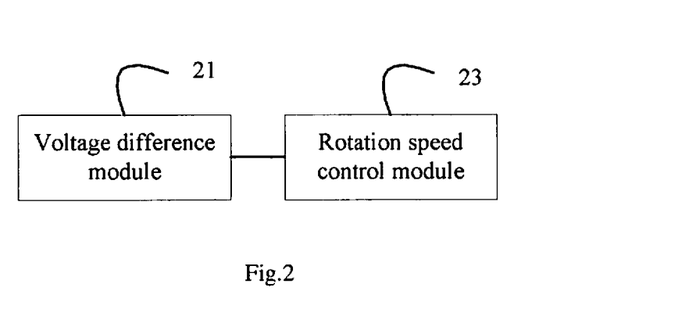
FIG. 2 is a schematic diagram of an apparatus for automatically equalizing bus bar voltages of a PFC circuit according to an embodiment of the invention.

Correspondingly, an automatic equalization apparatus for bus bar voltages of a PFC circuit is further provided according to the invention, and as illustrated in FIG. 2, the apparatus includes:

A voltage difference module 21 configured to calculate the difference in voltages of a positive bus bar and a negative bus bar; and A rotation speed control module 22 configured to increase the rotation speed of a fan in the PFC circuit by the difference in voltages of the positive bus bar and the negative bus bar until the voltages of the positive and negative bus bars are equalized.

Specifically, the voltage difference module 21 and the rotation speed control module 22 can be embodied using a microcontroller (e.g., a DSP) in the PFC circuit.

According to the automatic equalization apparatus for bus bar voltages of a PFC circuit according to the invention, based upon such a principle that when a PFC circuit operates in an uncontrolled rectification condition or a lightly loaded condition, the PFC circuit has increased output power and as a result an increased amount of transmitted waves of PWM, and accordingly the ability of a biased voltage loop to adjust the voltage equalization of positive and negative bus bars is also improved, thus by increasing the rotation speed of a fan by the difference in voltages of the positive and negative bus bars, the output power of the PFC circuit can be increased and further the ability of the biased voltage loop to adjust the voltage equalization of the bus bars can be improved, to achieve the purpose of adjusting the voltage equalization of the positive and negative bus bars. The apparatus can be embodied directly with a fan, a bus bar voltage sample circuit, a microcontroller, etc., existing in the PFC circuit, and can effectively address the problem of unbalanced voltages of the positive and negative bus bars when the PFC circuit operates in an uncontrolled rectification condition or is lightly loaded, without adding any other circuit in hardware and without changing an original circuit structure of the PFC circuit.

Figure 3:
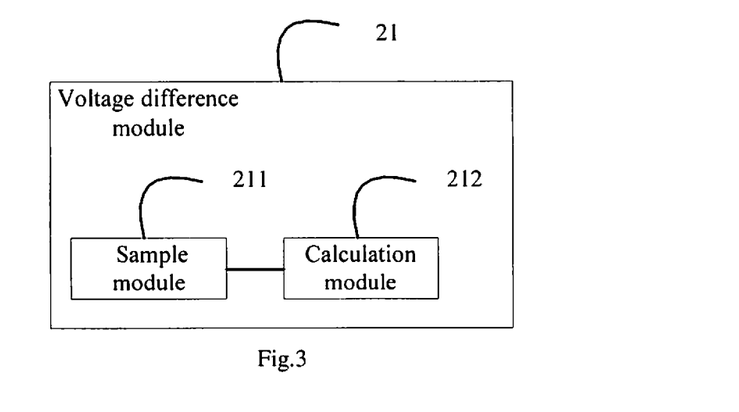
FIG. 3 is a schematic diagram of a particular structure of the determination and calculation module 21 in the apparatus illustrated in FIG. 2.

Preferably, as illustrated in FIG. 3, the voltage difference module 21 particularly includes:

A sample module 211 configured to determine the voltage of the positive bus bar and the voltage of the negative bus bar respectively; and A calculation module 212 configured to determine the difference between a preset voltage value and the difference between the voltage of the positive bus bar and the voltage of the negative bus bar as the difference in voltages of the positive bus bar and the negative bus bar.

The sample module 211 can obtain the voltages of the positive and negative bus bars with a bus bar voltage sample circuit in the PFC circuit.

Figure 4:
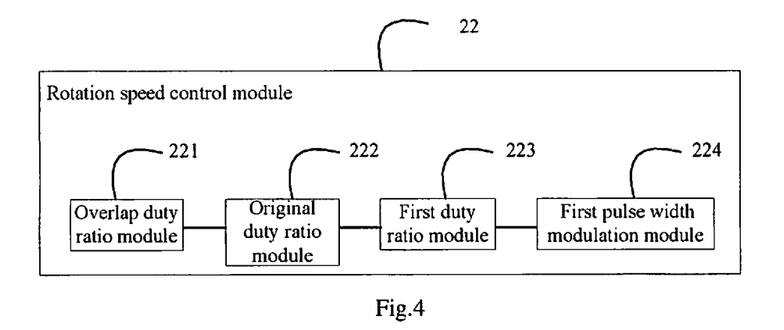
FIG. 4 is a schematic diagram of a particular structure of the rotation speed control module 22 in the apparatus illustrated in FIG. 2.

Preferably, as illustrated in FIG. 4, the rotation speed control module 22 can be composed of the following respective modules:

An overlap duty ratio module 221 configured to derive an overlap duty ratio signal from the difference in voltages of the positive bus bar and the negative bus bar;

An original duty ratio module 222 configured to determine an original duty ratio signal of the fan;

A first duty ratio module 223 configured to derive a duty ratio signal from the overlap duty ratio signal and the original duty ratio signal; and A first pulse width modulation module 224 to perform pulse width modulation on the duty ratio signal to generate a drive signal to drive the fan to increase the rotation speed.

Preferably, the overlap duty ratio module 221 particularly includes:

A first overlap transmitted wave calculation module 2211 configured to perform proportion-integration-differentiation control on the difference in voltages of the positive bus bar and the negative bus bar to obtain a comparison amount of overlap transmitted waves; and An overlap duty ratio calculation module 2212 configured to calculate the ratio of the comparison amount of overlap transmitted waves to a period amount of transmitted waves to obtain the overlap duty ratio signal.

Specifically, the first overlap transmitted wave calculation module 2211 can be embodied using a Proportion-Integration-Differentiation (PID) controller.

Preferably, when the rotation speed of the fan is in direct proportion to the duty ratio signal, the first duty ratio module 223 is particularly configured to sum the original duty ratio signal and the overlap duty ratio signal to obtain the duty ratio signal; or When the rotation speed of the fan is in inverse proportion to the duty ratio signal, the first duty ratio module 223 is particularly configured to subtract the overlap duty ratio signal and the original duty ratio signal to obtain the duty ratio signal.

Figure 5:
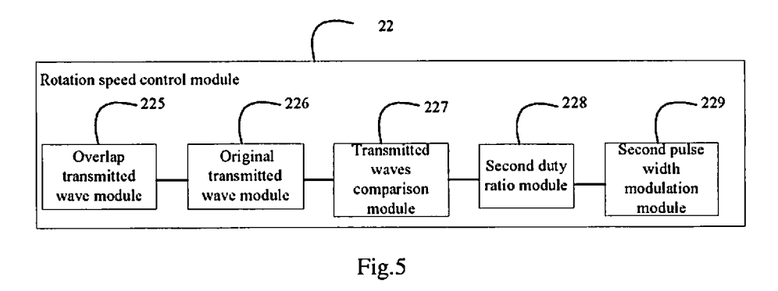
FIG. 5 is a schematic diagram of another particular structure of the rotation speed control module 22 in the apparatus illustrated in FIG. 2.

Preferably, as illustrated in FIG. 5, the rotation speed control module 22 can further be composed of the following respective modules:

An overlap transmitted wave module 225 configured to determine a comparison amount of overlap transmitted waves from the difference in voltages of the positive bus bar and the negative bus bar;

An original transmitted wave module 226 configured to determine a comparison amount of original transmitted waves of a fan;

A transmitted wave comparison module 227 configured to derive a comparison amount of transmitted waves from the comparison amount of original transmitted waves and the comparison amount of overlap transmitted waves;

A second duty ratio module 228 configured to calculate the ratio of the comparison amount of transmitted waves to a period amount of transmitted waves to obtain a duty ratio signal; and A second pulse width modulation module 229 configured to perform pulse width modulation on the duty ratio signal to generate a drive signal to drive the fan to increase the rotation speed.

Preferably, the overlap transmitted wave module 225 is particularly configured to perform proportion-integration-differentiation control on the difference in voltages of the positive bus bar and the negative bus bar to obtain the comparison amount of overlap transmitted waves.

Preferably, the overlap transmitted wave module 225 can be embodied as a proportion-integration-differentiation PID controller.

Preferably, when the rotation speed of the fan is in direct proportion to the duty ratio signal, the transmitted wave comparison module 227 is particularly configured to sum the comparison amount of original transmitted waves and the comparison amount of overlap transmitted waves to obtain the comparison amount of transmitted waves;

When the rotation speed of the fan is in inverse proportion to the duty ratio signal, the transmitted wave comparison module 227 is particularly configured to subtract the comparison amount of overlap transmitted waves and the comparison amount of original transmitted waves to obtain the comparison amount of transmitted waves.

The automatic equalization method and apparatus for bus bar voltages of a PFC circuit according to the invention will be detailed below with respect to particular embodiments.

First Embodiment

Figure 6:
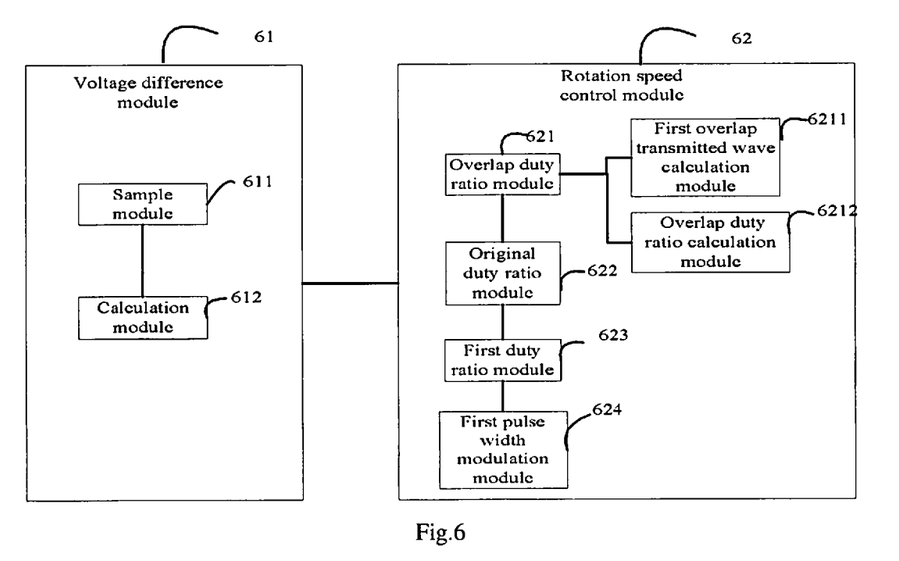
FIG. 6 is a schematic structural diagram of an apparatus for automatically equalizing bus bar voltages of a PFC circuit according to a first embodiment.

This embodiment provides an automatic equalization apparatus for bus bar voltages of a PFC circuit, and as illustrated in FIG. 6, the apparatus includes a voltage difference module 61 and a rotation speed control module 62.

Particularly the voltage difference module 61 further includes a sample module 611 and a calculation module 612, and the calculation module 612 provides a preset voltage value ΔVref which is a real level of voltage quantity;

The rotation speed control module 62 particularly includes an overlap duty ratio module 621, an original duty ratio module 622, a first duty ratio module 623 and a first pulse width modulation module 624; and The overlap duty ratio module 621 includes a first overlap transmitted wave calculation module 6211 and an overlap duty ratio calculation module 6212; and the first overlap transmitted wave calculation module 6211 is embodied as a proportion controller (i.e., a P controller), and the P controller provides a proportion coefficient k (k≠0) for converting the difference in voltages of positive and negative bus bars calculated by the voltage difference module 61 into a comparison amount of overlap transmitted waves in a proportion relationship.

Figure 7:
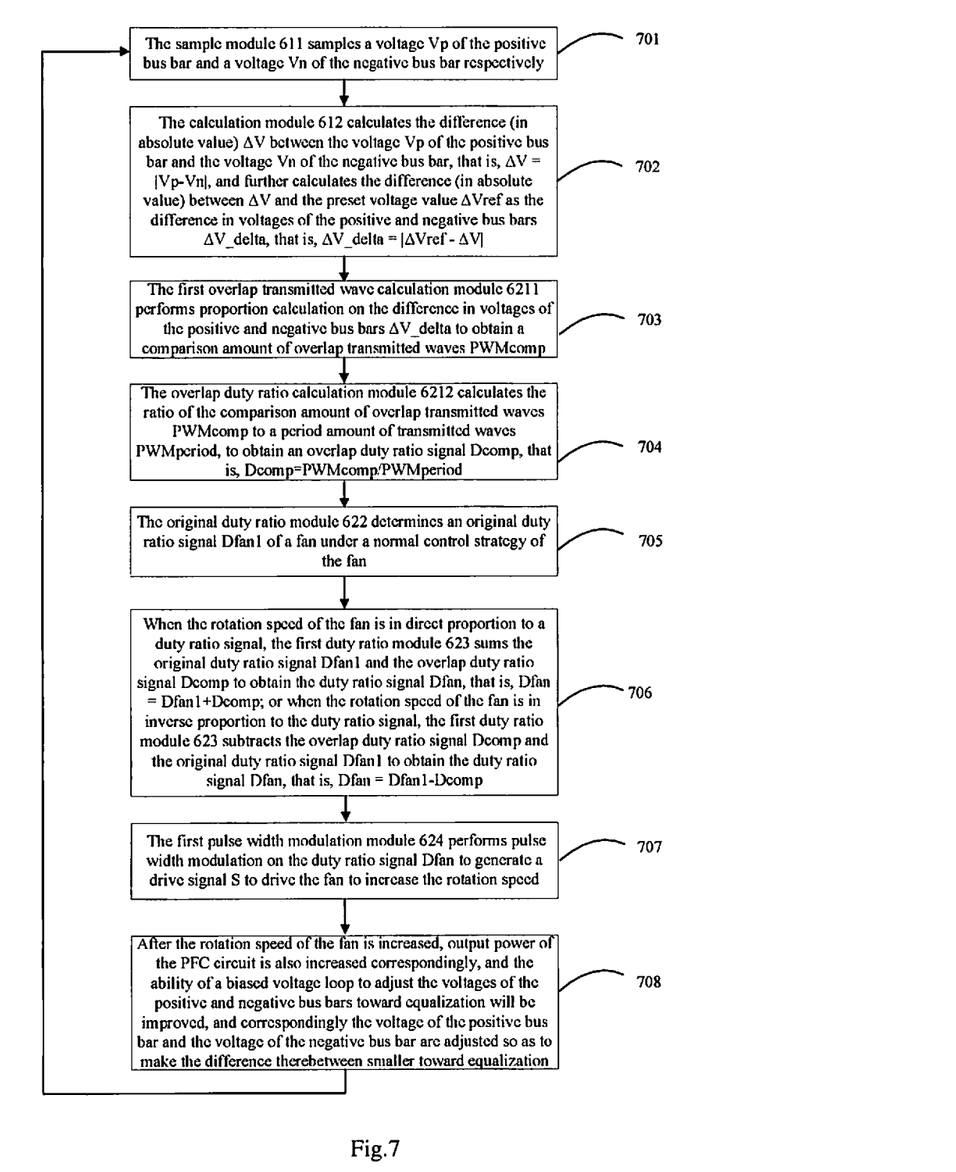
FIG. 7 is an operation flow chart of the apparatus for automatically equalizing bus bar voltages of a PFC circuit according to the first embodiment.

As illustrated in FIG. 7, an operation process and an operation principle of the apparatus according to this embodiment are as follows:

In step 701, the sample module 611 samples a voltage Vp of the positive bus bar and a voltage Vn of the negative bus bar respectively;

In step 702, the calculation module 612 calculates the difference (in absolute value) ΔV between the voltage Vp of the positive bus bar and the voltage Vn of the negative bus bar, that is, $\Delta V = |Vp - Vn|$, and further calculates the difference (in absolute value) between ΔV and the preset voltage value ΔVref as the difference in voltages of the positive and negative bus bars ΔV_delta, that is, $\Delta V\_delta = |\Delta Vref - \Delta V|$; and in this step, the difference can be calculated without conversion because the preset voltage value ΔVref is a real level of voltage quantity and ΔV is also a real level of voltage quantity;

In step 703, the first overlap transmitted wave calculation module 6211 performs proportion calculation on the difference in voltages of the positive and negative bus bars ΔV_delta to obtain a comparison amount of overlap transmitted waves PWMcomp; and in this step, the Proportion (P) controller used by the first overlap transmitted wave calculation module 6211 provides the proportion coefficient k, and PWMcomp is calculated with the formula of $PWMcomp = k \times \Delta V\_delta$;

In step 704, the overlap duty ratio calculation module 6212 calculates the ratio of the comparison amount of overlap transmitted waves PWMcomp to a period amount of transmitted waves PWMperiod as an overlap duty ratio signal Dcomp, that is, $Dcomp = PWMcomp/PWMperiod$, where the period amount of transmitted waves PWMperiod is stored in a period register of a microcontroller (e.g., a DSP) in the PFC circuit as a constant quantity;

In step 705, the original duty ratio module 622 determines an original duty ratio signal Dfan1 of a fan under a normal control strategy of the fan;

In step 706, when the rotation speed of the fan is in direct proportion to a duty ratio signal, the first duty ratio module 623 sums the original duty ratio signal Dfan1 and the overlap duty ratio signal Dcomp to obtain the duty ratio signal Dfan, that is, Dfan=Dfan1+Dcomp; or when the rotation speed of the fan is in inverse proportion to the duty ratio signal, the first duty ratio module 623 subtracts the overlap duty ratio signal Dcomp and the original duty ratio signal Dfan1 to obtain the duty ratio signal Dfan, that is, Dfan=Dfan1−Dcomp;

In step 707, the first pulse width modulation module 624 performs pulse width modulation on the duty ratio signal Dfan to generate a drive signal S to drive the fan to increase the rotation speed; and In step 708, after the rotation speed of the fan is increased, output power of the PFC circuit is also increased therewith, and the ability of a biased voltage loop to adjust the voltages of the positive and negative bus bars toward equalization will be improved, therefore the voltage of the positive bus bar and the voltage of the negative bus bar will be adjusted so as to make the difference (in absolute value) therebetween smaller toward equalization; and the flow returns to step 701 for performance of a next loop.

In this embodiment, the value of the proportion coefficient k provided by the P controller will influence the magnitude of the amount of change in rotation speed of the fan arising from the difference in voltages of the positive and negative bus bars, for example, when k takes a larger value, the change in rotation speed of the fan will be larger per volt of the difference in voltages of the positive and negative bus bars, and on the contrary, when k takes a smaller value, the change in rotation speed of the fan will be smaller per volt of the difference in voltages of the positive and negative bus bars.

In this embodiment, the proportion coefficient k can be determined as follows: a function relationship between the difference in voltages of the positive and negative bus bars $\Delta V\_delta$ and the amount of the change in rotation speed of the fan $\Delta Vfan$ is determined through mathematic modeling, and finally the value of the proportion coefficient k is determined in this function relationship; or instead of the mathematic modeling process, a function relationship between the difference in voltages of the positive and negative bus bars $\Delta V\_delta$ and the amount of the change in rotation speed of the fan $\Delta Vfan$ is determined empirically by performing real measurements and recording for a plurality of times the differences in voltages of the positive and negative bus bars $\Delta V\_delta$ and the amounts of the change in rotation speed of the fan $\Delta Vfan$ derived from $\Delta V\_delta$, and an appropriate value is empirically determined as the value of the proportion coefficient k.

In the control process of this embodiment, due to the use of the Proportion (P) controller, the bus bars will finally settle at a stability point with a specific static offset, and in order to cancel the static offset, some advanced controllers can be adopted, e.g., a Proportion-Integration (PI) controller.

Second Embodiment

Figure 8:
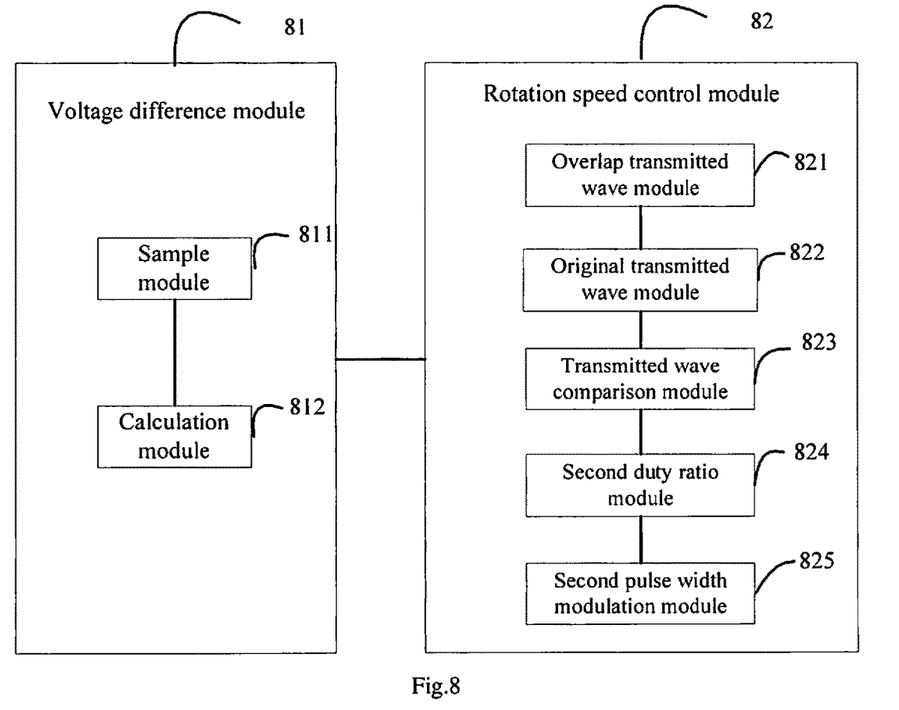
FIG. 8 is a schematic structural diagram of an apparatus for automatically equalizing bus bar voltages of a PFC circuit according to a second embodiment.

This embodiment provides an automatic equalization apparatus for bus bar voltages of a PFC circuit, and as illustrated in FIG. 8, the apparatus includes a voltage difference module 81 and a rotation speed control module 82.

Particularly the voltage difference module 81 further includes a sample module 811 and a calculation module 812, and the calculation module 812 provides a preset voltage value $\Delta Vref$ which is an analogy level of voltage quantity in a proportion relationship 1:n with a real level of voltage quantity, where n>0.

The rotation speed control module 82 particularly includes an overlap transmitted wave module 821, an original transmitted wave module 822, a transmitted wave comparison module 823, a second duty ratio module 824 and a second pulse width modulation module 825.

The overlap transmitted wave module 821 is embodied as a Proportion-Integration controller (i.e., a PI controller).

Figure 9:
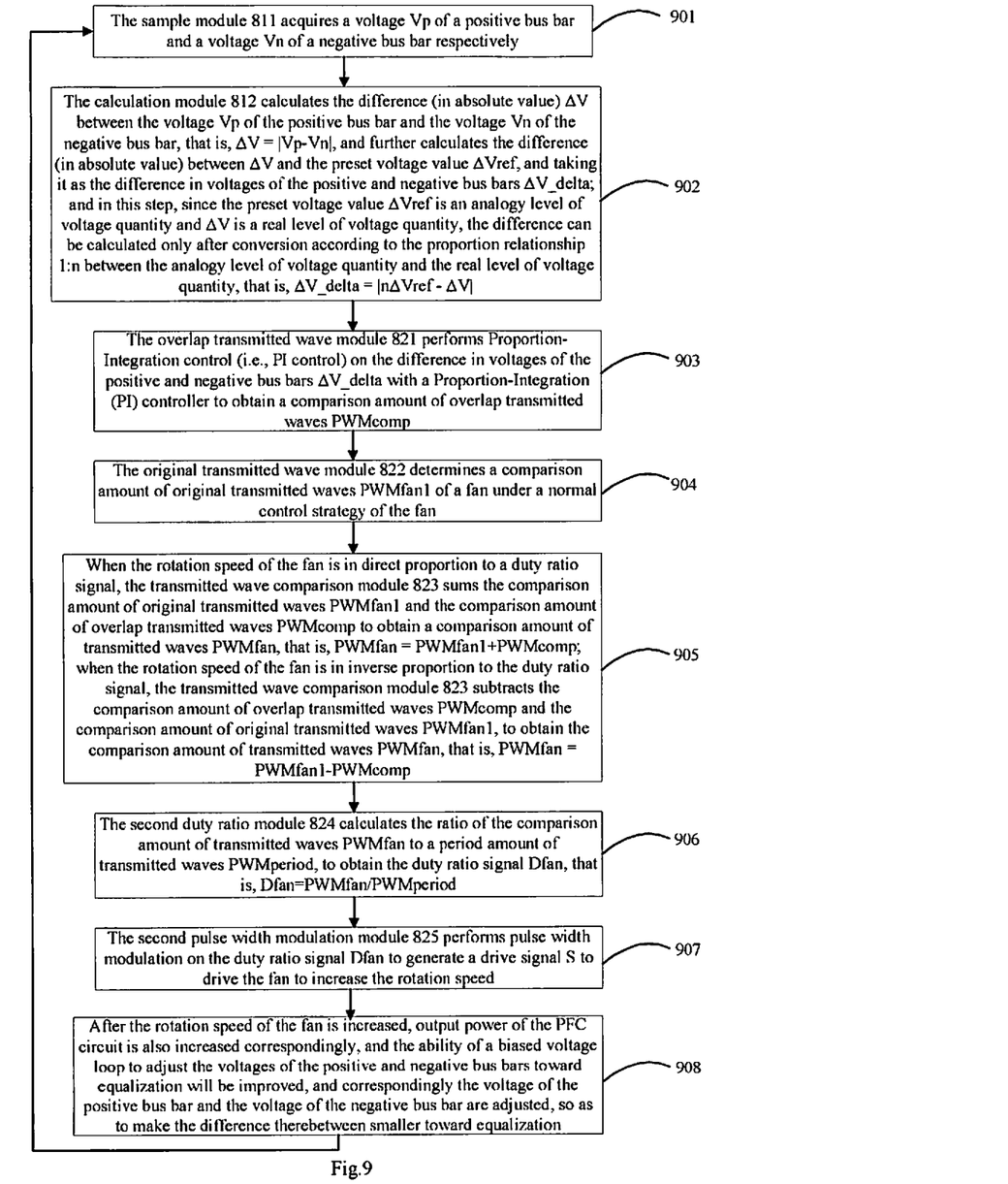
FIG. 9 is an operation flow chart of the apparatus for automatically equalizing bus bar voltages of a PFC circuit according to the second embodiment.
Figure 10:
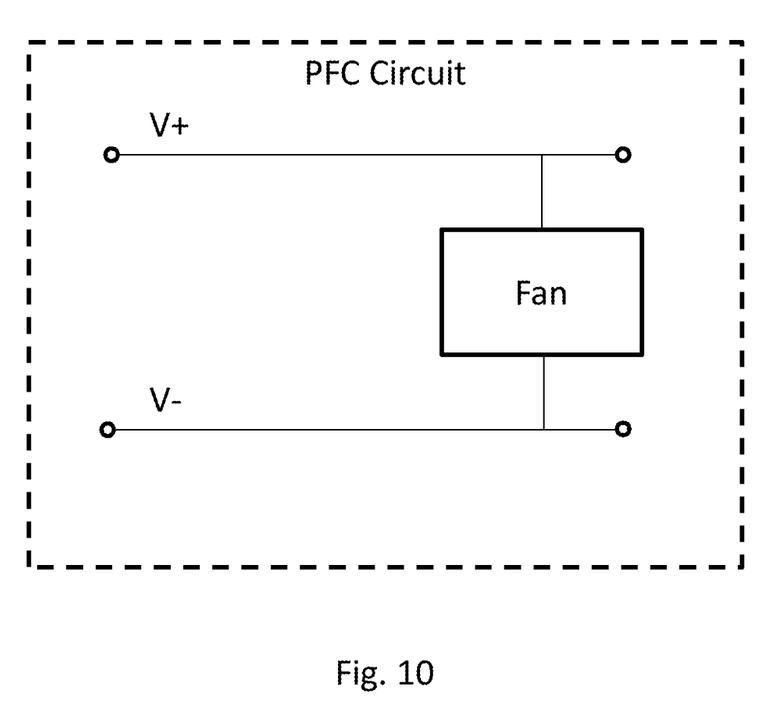
FIG. 10 is a block diagram of a PFC circuit including a positive bus bar, a negative bus bar, and a fan, according to another example embodiment of the present disclosure.

As illustrated in FIG. 9, an operation process and an operation principle of the apparatus according to this embodiment are as follows:

In step 901, the sample module 811 samples a voltage Vp of a positive bus bar and a voltage Vn of a negative bus bar respectively;

In step 902, the calculation module 812 calculates the difference (in absolute value) $\Delta V$ between the voltage Vp of the positive bus bar and the voltage Vn of the negative bus bar, that is, $\Delta V=|Vp-Vn|$, and further calculates the difference (in absolute value) between $\Delta V$ and the preset voltage value $\Delta Vref$ as the difference in voltages of the positive and negative bus bars $\Delta V\_delta$; and in this step, since the preset voltage value $\Delta Vref$ is an analogy level of voltage quantity and $\Delta V$ is a real level of voltage quantity, the difference can be calculated only after conversion according to the proportion relationship 1:n between the analogy level of voltage quantity and the real level of voltage quantity, that is, $\Delta V\_delta=|n\Delta Vref-\Delta V|$;

In step 903, the overlap transmitted wave module 821 performs Proportion-Integration control (i.e., PI control) on the difference in voltages of the positive and negative bus bars $\Delta V\_delta$ with a Proportion-Integration (PI) controller to obtain a comparison amount of overlap transmitted waves PWMcomp;

In step 904, the original transmitted wave module 822 determines a comparison amount of original transmitted waves PWMfan1 of a fan under a normal control strategy of the fan;

In step 905, when the rotation speed of the fan is in direct proportion to a duty ratio signal, the transmitted wave comparison module 823 sums the comparison amount of original transmitted waves PWMfan1 and the comparison amount of overlap transmitted waves PWMcomp to obtain a comparison amount of transmitted waves PWMfan, that is, PWMfan=PWMfan1+PWMcomp; or when the rotation speed of the fan is in inverse proportion to the duty ratio signal, the transmitted wave comparison module 823 subtracts the comparison amount of overlap transmitted waves PWMcomp and the comparison amount of original transmitted waves PWMfan1 to obtain the comparison amount of transmitted waves PWMfan, that is, PWMfan=PWMfan1−PWMcomp;

In step 906, the second duty ratio module 824 calculates the ratio of the comparison amount of transmitted waves PWMfan to a period amount of transmitted waves PWMperiod to obtain the duty ratio signal Dfan, that is, Dfan=PWMfan/PWMperiod, where the period amount of transmitted waves PWMperiod is stored in a period register in the PFC circuit as a constant value;

In step 907, the second pulse width modulation module 826 performs pulse width modulation on the duty ratio signal Dfan to generate a drive signal S to drive the fan to increase the rotation speed; and In step 908, after the rotation speed of the fan is increased, output power of the PFC circuit is also increased therewith, and the ability of a biased voltage loop to adjust the voltages of the positive and negative bus bars toward equalization will be improved to adjust correspondingly the voltage of the positive bus bar and the voltage of the negative bus bar so as to make the difference (in absolute value) therebetween smaller toward equalization; and the flow returns to step 901 for performance of a next loop.

In the control process of this embodiment, due to the use of the PI controller, a static error can be avoided from occurring, so that the apparatus can have a better effect of equalizing bus bar voltages.

According to the automatic equalization method and apparatus for bus bar voltages of a PFC circuit of the invention, with the use of such a principle that when a PFC circuit operates in an approximately uncontrolled rectification condition or is lightly loaded, the PFC circuit has increased output power, and the ability of a biased voltage loop to adjust the voltage equalization of positive and negative bus bars is improved, thus by increasing the rotation speed of a fan by the difference in voltages of the positive and negative bus bars, the output power of the PFC circuit can be increased, thereby achieving the purpose of adjusting the voltage equalization of the positive and negative bus bars. The invention can effectively address the problem of unbalanced voltages of the positive and negative bus bars when the PFC circuit operates in an uncontrolled rectification condition and is lightly loaded, without adding any other circuit in hardware to the PFC circuit and without changing an original circuit structure of the PFC circuit.

It is obvious that those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for automatically equalizing a bus bar voltage of a Power Factor Correction (PFC) circuit, the method comprising:
    calculating a difference in voltages of a positive bus bar of the PFC circuit and a negative bus bar of the PFC circuit by determining a voltage of the positive bus bar and a voltage of the negative bus bar, respectively, and determining a difference between the voltage of the positive bus bar and an absolute value of the voltage of the negative bus bar;
    comparing the calculated difference in voltages of the positive bus bar and the negative bus bar to a preset voltage value; and
    increasing a rotation speed of a fan directly or indirectly connected across the positive bus bar and the negative bus bar in the PFC circuit according to the calculated difference in voltages of the positive bus bar and the negative bus bar to increase a load of the PFC circuit for enhancing adjustment of the bus bar voltages by a biased voltage loop of the PFC circuit, until the calculated difference in voltages of the positive and negative bus bars is below the preset voltage value.

2. The method according to claim 1, wherein increasing the rotation speed of a fan in the PFC circuit according to the difference in voltages of the positive bus bar and the negative bus bar comprises:
    deriving an overlap duty ratio signal from the difference in voltages of the positive bus bar and the negative bus bar;
    determining an original duty ratio signal of the fan;
    deriving a duty ratio signal from the overlap duty ratio signal and the original duty ratio signal; and
    performing pulse width modulation on the duty ratio signal to generate a drive signal for driving the fan to increase the rotation speed.

3. The method according to claim 2, wherein deriving an overlap duty ratio signal from the difference in voltages of the positive bus bar and the negative bus bar comprises:
    performing proportional-integral-derivative control on the difference in voltages of the positive bus bar and the negative bus bar to obtain a comparison amount of overlap transmitted waves; and
    calculating a ratio of the comparison amount of overlap transmitted waves to a period amount of transmitted waves to obtain the overlap duty ratio signal.

4. The method according to claim 2, wherein:
    if the rotation speed of the fan is in direct proportion to the duty ratio signal, deriving the duty ratio signal from the overlap duty ratio signal and the original duty ratio signal includes summing the original duty ratio signal and the overlap duty ratio signal to obtain the duty ratio signal; and
    if the rotation speed of the fan is in inverse proportion to the duty ratio signal, deriving the duty ratio signal from the overlap duty ratio signal and the original duty ratio signal includes subtracting the overlap duty ratio signal and the original duty ratio signal to obtain the duty ratio signal.

5. The method according to claim 1, wherein increasing the rotation speed of a fan in the PFC circuit by the difference in voltages of the positive bus bar and the negative bus bar comprises:
    determining a comparison amount of overlap transmitted waves from the difference in voltages of the positive bus bar and the negative bus bar;
    determining a comparison amount of original transmitted waves of the fan;
    deriving a comparison amount of transmitted waves from the comparison amount of original transmitted waves and the comparison amount of overlap transmitted waves;
    calculating a ratio of the comparison amount of transmitted waves to a period amount of transmitted waves to obtain a duty ratio signal; and
    performing pulse width modulation on the duty ratio signal to generate a drive signal for driving the fan to increase the rotation speed.

6. The method according to claim 5, wherein determining the comparison amount of overlap transmitted waves from the difference in voltages of the positive bus bar and the negative bus bar comprises:
    performing proportional-integral-derivative control on the difference in voltages of the positive bus bar and the negative bus bar to obtain the comparison amount of overlap transmitted waves.

7. The method according to claim 5, wherein:
    if the rotation speed of the fan is in direct proportion to the duty ratio signal, deriving the comparison amount of transmitted waves from the comparison amount of original transmitted waves and the comparison amount of overlap transmitted waves includes summing the comparison amount of original transmitted waves and the comparison amount of overlap transmitted waves to obtain the comparison amount of transmitted waves; and
    if the rotation speed of the fan is in inverse proportion to the duty ratio signal, deriving the comparison amount of transmitted waves from the comparison amount of original transmitted waves and the comparison amount of overlap transmitted waves includes subtracting the comparison amount of overlap transmitted waves and the comparison amount of original transmitted waves to obtain the comparison amount of transmitted waves.

8. The method of claim 1, wherein increasing a rotation speed of the fan includes increasing a rotation speed of the fan only when the calculated difference in voltages of the positive bus bar and the negative bus bar exceeds the preset voltage value.

9. An apparatus for automatically equalizing bus bar voltages of a Power Factor Correction (PFC) circuit, the apparatus comprising:
a voltage difference module configured to calculate a difference in voltages of a positive bus bar of the PFC circuit and a negative bus bar of the PFC circuit, the voltage difference module including a sample module and a calculation module, the sample module configured to determine a voltage of the positive bus bar and a voltage of the negative bus bar, respectively, and the calculation module configured to determine a difference between the voltage of the positive bus bar and an absolute value of the voltage of the negative bus bar, and to compare the determined difference between the positive bus bar voltage and the negative bus bar voltage to a preset voltage value; and
a rotation speed control module configured to increase a rotation speed of a fan directly or indirectly connected across the positive bus bar and the negative bus bar in the PFC circuit according to the calculated difference in voltages of the positive bus bar and the negative bus bar to increase a load of the PFC circuit for enhancing adjustment of the bus bar voltages by a biased voltage loop of the PFC circuit, until the calculated difference in voltages of the positive and negative bus bars is below the preset voltage value.

10. The apparatus according to claim 9, wherein the rotation speed control module comprises:
an overlap duty ratio module configured to derive an overlap duty ratio signal from the difference in voltages of the positive bus bar and the negative bus bar;
an original duty ratio module configured to determine an original duty ratio signal of the fan;
a first duty ratio module configured to derive a duty ratio signal from the overlap duty ratio signal and the original duty ratio signal; and
a first pulse width modulation module configured to perform pulse width modulation on the duty ratio signal to generate a drive signal for driving the fan to increase the rotation speed.

11. The apparatus according to claim 10, wherein the overlap duty ratio module comprises:
a first overlap transmitted wave calculation module configured to perform proportional-integral-derivative control on the difference in voltages of the positive bus bar and the negative bus bar to obtain a comparison amount of overlap transmitted waves; and
an overlap duty ratio calculation module configured to calculate a ratio of the comparison amount of overlap transmitted waves to a period amount of transmitted waves to obtain the overlap duty ratio signal.

12. The apparatus according to claim 10, wherein:
if the rotation speed of the fan is in direct proportion to the duty ratio signal, the first duty ratio module is configured to sum the original duty ratio signal and the overlap duty ratio signal to obtain the duty ratio signal; and
if the rotation speed of the fan is in inverse proportion to the duty ratio signal, the first duty ratio module is configured to subtract the overlap duty ratio signal and the original duty ratio signal to obtain the duty ratio signal.

13. The apparatus according to claim 9, wherein the rotation speed control module comprises:
an overlap transmitted wave module configured to determine a comparison amount of overlap transmitted waves from the difference in voltages of the positive bus bar and the negative bus bar;
an original transmitted wave module configured to determine a comparison amount of original transmitted waves of the fan;
a transmitted wave comparison module configured to derive a comparison amount of transmitted waves from the comparison amount of original transmitted waves and the comparison amount of overlap transmitted waves;
a second duty ratio module configured to calculate the ratio of the comparison amount of transmitted waves to a period amount of transmitted waves to obtain a duty ratio signal; and
a second pulse width modulation module configured to perform pulse width modulation on the duty ratio signal to generate a drive signal for driving the fan to increase the rotation speed.

14. The apparatus according to claim 13, wherein the overlap transmitted wave module is configured to perform proportional-integral-derivative control on the difference in voltages of the positive bus bar and the negative bus bar to obtain the comparison amount of overlap transmitted waves.

15. The apparatus according to claim 13, wherein:
if the rotation speed of the fan is in direct proportion to the duty ratio signal, the transmitted wave comparison module is configured to sum the comparison amount of original transmitted waves and the comparison amount of overlap transmitted waves to obtain the comparison amount of transmitted waves; and
if the rotation speed of the fan is in inverse proportion to the duty ratio signal, the transmitted wave comparison module is configured to subtract the comparison amount of overlap transmitted waves and the comparison amount of original transmitted waves to obtain the comparison amount of transmitted waves.

16. The apparatus of claim 9, wherein the rotation speed control module is configured to increase a rotation speed of the fan only when the calculated difference in voltages of the positive bus bar and the negative bus bar exceeds the preset voltage value.

* * * * *